US010075015B2

(12) United States Patent
Rohr et al.

(10) Patent No.: US 10,075,015 B2
(45) Date of Patent: Sep. 11, 2018

(54) MAINTENANCE TRANSFER SWITCH

(71) Applicant: SCHNEIDER ELECTRIC IT CORPORATION, West Kingston, RI (US)

(72) Inventors: Daniel J. Rohr, Wildwood, MO (US); Michael Richard Zlatic, Des Peres, MO (US); Kevin M. Kemper, Lake Saint Louis, MO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 285 days.

(21) Appl. No.: 15/104,371

(22) PCT Filed: Dec. 19, 2013

(86) PCT No.: PCT/US2013/076581
§ 371 (c)(1),
(2) Date: Jun. 14, 2016

(87) PCT Pub. No.: WO2015/094290
PCT Pub. Date: Jun. 25, 2015

(65) Prior Publication Data
US 2017/0005510 A1 Jan. 5, 2017

(51) Int. Cl.
*H02J 9/06* (2006.01)
(52) U.S. Cl.
CPC ............... *H02J 9/06* (2013.01); *H02J 9/061* (2013.01)

(58) Field of Classification Search
CPC .................... H02J 9/06; H02J 9/061
See application file for complete search history.

(56) References Cited

U.S. PATENT DOCUMENTS

| 6,653,751 | B1 | 11/2003 | Teh Lo |
| 8,379,359 | B2 | 2/2013 | Klikic et al. |
| 2008/0258556 | A1 | 10/2008 | Ewing et al. |
| 2011/0068625 | A1 | 3/2011 | Duan et al. |
| 2012/0181872 | A1 | 7/2012 | Lim et al. |
| 2012/0242145 | A1 | 9/2012 | Espeut, Jr. |

FOREIGN PATENT DOCUMENTS

WO    2008113047 A2    9/2008

OTHER PUBLICATIONS

Extended European Search Report from corresponding European Application No. 13899709.3 dated Jul. 3, 2017.
International Search Report and Written Opinion from corresponding International Application No. PCT/US2013/076581 dated Apr. 16, 2014.

*Primary Examiner* — Robert Deberadinis
(74) *Attorney, Agent, or Firm* — Lando & Anastasi, LLP

(57) ABSTRACT

Disclosed herein are methods and systems for providing electrical power to an electrical system. An automatic transfer switch selectively provides power to the electrical system from one or more power supplies through a plurality of power outlet connectors of the automatic transfer switch. The plurality of power outlet connectors of the automatic transfer switch are selectively electrically connected to the one or more power supplies responsive to a state of health of the one or more power supplies.

20 Claims, 6 Drawing Sheets

MAINTENANCE TRANSFER SWITCH

CROSS REFERENCE TO RELATED APPLICATIONS

This application is a U.S. National Stage Application under 35 U.S.C. § 371 of International Application No. PCT/US2013/076581,filed Dec. 19, 2013, titled MAINTENANCE TRANSFER SWITCH, which is hereby incorporated herein by reference in its entirety.

BACKGROUND

1. Technical Field

Aspects and embodiments of the present disclosure relate to systems and methods for facilitating the continued delivery of power to an electrical system upon failure of a power source for the electrical system.

2. Discussion of Related Art

It is often desirable to provide critical electrical systems, for example, servers in a data center, with redundant power sources so that the failure of a single power source will not cause power flow to the electrical systems to be interrupted. A transfer switch may be supplied with power from more than one power source and deliver power to a critical electrical system. Upon failure of one power source, the transfer switch may be used to connect the critical electrical system to a second power source.

SUMMARY

In accordance with one aspect, there is provided an automatic transfer switch. The automatic transfer switch comprises a plurality of power input connectors, a plurality of power output connectors, and at least one electrical switch configured to selectively electrically connect the at least one of the plurality of power input connectors to at least one of the plurality of power output connectors. The at least one electrical switch may include a plurality of electrical inputs in electrical communication with a first of the plurality of power input connectors, a plurality of electrical inputs in electrical communication with a second of the plurality of power input connectors, and a plurality of electrical outputs in electrical communication with a first of the plurality of power output connectors.

The at least one electrical switch may be configured to selectively electrically connect the first of the plurality of power output connectors to one of the first of the plurality of power input connectors and the second of the plurality of power input connectors and to selectively electrically connect a second of the plurality of power output connectors to one of the first of the plurality of power input connectors and the second of the plurality of power input connectors. The at least one electrical switch may be configured to selectively electrically connect the first of the plurality of power output connectors and the second of the plurality of power output connectors to the second of the plurality of power input connectors responsive to failure of a power supply electrically connected to the first of the plurality of power input connectors.

The at least one electrical switch may include a first relay in electrical communication with the first of the plurality of power output connectors and a second relay in electrical communication with the second of the plurality of power output connectors. The at least one electrical switch may include a plurality of relays electrically connected in series. The at least one electrical switch may include at least one solid state switch electrically connected in parallel with the relay.

The automatic transfer switch may further comprise a selector switch. The selector switch may be configured to set the automatic transfer switch in one of a mode in which power delivered to the plurality of power output connectors is drawn from the first of the plurality of power inlet connectors and the second of the plurality of power inlet connectors, a mode in which power delivered to the plurality of power output connectors is drawn from the first of the plurality of power inlet connectors only, and a mode in which power delivered to the plurality of power output connectors is drawn from the second of the plurality of power inlet connectors only. The selector switch may be a manually operated switch. The selector switch may be an electrically operated switch.

The automatic transfer switch may have a default mode wherein power is delivered to the first of the plurality of power output connectors from the first of the plurality of power input connectors and power is delivered to the second of the plurality of power output connectors from the second of the plurality of power input connectors.

The automatic transfer switch may include a first sub-unit and a second sub-unit, each of the first sub-unit and the second sub-unit including a plurality of power input connectors and a plurality of power output connectors. A first of the plurality of power output connectors of the first sub-unit may be electrically coupled to a first of the plurality of power input connectors of the second sub-unit, and a first of the plurality of power output connectors of the second sub-unit may be electrically coupled to a first of the plurality of power input connectors of the first sub-unit. A direct current power source in the first sub-module may be electrically coupled to a direct current power inlet of the second sub-module. A direct current power source in the second sub-module may be electrically coupled to a direct current power inlet of the first sub-module.

In accordance with one aspect, there is provided a method of providing power to an electrical system. The method comprises electrically connecting a first power source to a first power inlet of an automatic transfer switch, electrically connecting a second power source to a second power inlet of the automatic transfer switch, electrically connecting the first power inlet of the automatic transfer switch to a first power outlet of the automatic transfer switch, and electrically connecting the first power inlet of the automatic transfer switch to a first power outlet of the automatic transfer switch with a first electrical switch. The first electrical switch includes a plurality of electrical inputs in electrical communication with the first power inlet, a plurality of electrical inputs in electrical communication with the second power inlet, and a plurality of electrical outputs in electrical communication with the first power outlet. The method further comprises electrically connecting the second power inlet of the automatic transfer switch to a second power outlet of the automatic transfer switch with a second electrical switch. The second electrical switch includes a plurality of electrical inputs in electrical communication with the first power inlet, a plurality of electrical inputs in electrical communication with the second power inlet, and a plurality of electrical outputs in electrical communication with the second power outlet. The method further comprises electrically connecting the first power outlet of the automatic transfer switch to a first power inlet of the electrical system and electrically connecting the second power outlet of the automatic transfer switch to a second power inlet of the electrical system.

The method may further comprise, responsive to a failure of the first power supply, electrically disconnecting the first power inlet of the automatic transfer switch from the first power outlet of the automatic transfer switch and electrically connecting the second power inlet of the automatic transfer switch to the first power outlet of the automatic transfer switch. Electrically connecting the second power inlet of the automatic transfer switch to the first power outlet of the automatic transfer switch may include electrically connecting the second power inlet of the automatic transfer switch to the first power outlet of the automatic transfer switch through a solid state electrical switch, electrically connecting the second power inlet of the automatic transfer switch to the first power outlet of the automatic transfer switch through a relay, and opening the solid state electrical switch and terminating electrical connection between the second power inlet of the automatic transfer switch and the first power outlet of the automatic transfer switch through the solid state electrical switch after electrically connecting the second power inlet of the automatic transfer switch to the first power outlet of the automatic transfer switch through the relay. Electrically connecting the second power inlet of the automatic transfer switch to the first power outlet of the automatic transfer switch may include electrically connecting the second power inlet of the automatic transfer switch to the first power outlet of the automatic transfer switch though a plurality of relays electrically connected in series.

The method may further comprise, responsive to a selection of an operating mode of the automatic transfer switch with a selector switch of the automatic transfer switch, electrically disconnecting the first power inlet of the automatic transfer switch from the first power outlet of the automatic transfer switch and electrically connecting the second power inlet of the automatic transfer switch to the first power outlet of the automatic transfer switch.

The method may further comprise electrically connecting the first power source to a first power inlet of a first sub-unit of the automatic transfer switch, electrically connecting the first second source to a first power inlet of a second sub-unit of the automatic transfer switch, electrically connecting a first power outlet of the first sub-unit of the automatic transfer switch to a second power inlet of the second sub-unit of the automatic transfer switch, and electrically connecting a first power outlet of the second sub-unit of the automatic transfer switch to a second power inlet of the first sub-unit of the automatic transfer switch. Electrically connecting the first power outlet of the automatic transfer switch to the first power inlet of the electrical system may include electrically connecting a second power outlet of the first sub-unit of the automatic transfer switch to the first power inlet of the electrical system. Electrically connecting the second power outlet of the automatic transfer switch to the second power inlet of the electrical system may include electrically connecting a second power outlet of the second sub-unit of the automatic transfer switch to the second power inlet of the electrical system.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
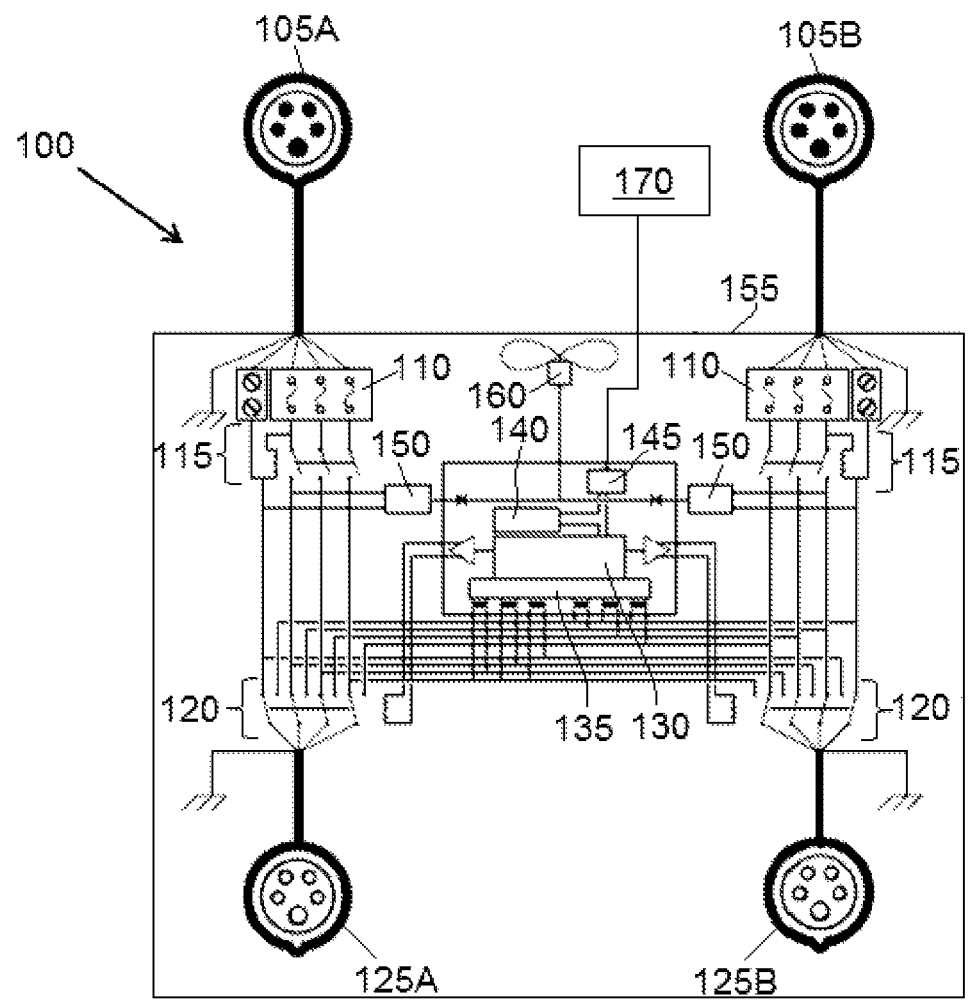
FIG. 1 is a schematic diagram of an automatic transfer switch.

Aspects and embodiments disclosed herein are not limited to the details of construction and the arrangement of components set forth in the following description or illustrated in the drawings. The disclosed aspect and embodiments are capable of being practiced or of being carried out in various ways. The phraseology and terminology used herein is for the purpose of description and should not be regarded as limiting. The use of "including," "comprising," "having," "containing," "involving," and variations thereof herein is meant to encompass the items listed thereafter and equivalents thereof.

Aspects and embodiments disclosed herein include systems and methods which may facilitate the continued delivery of power to an electrical system upon the failure of a power source for the electrical system. These disclosed systems and methods are generally directed to transfer switches which may be utilized to selectively deliver power to an electrical system from one of a plurality of power sources. A non-limiting example of a type of electrical system which the disclosed transfer switches may be utilized to supply power to include, for example, computer servers which may be located in a data center. The disclosed transfer switches may also or alternatively be used with other forms of electrical systems to which interruption of power is undesirable, and the disclosed aspects and embodiments are not limited to use with any particular electrical systems. The disclosed transfer switches may operate in automatic mode, manual mode, or a hybrid automatic/manual mode. Various embodiments of transfer switches disclosed herein will be referred to as automatic transfer switches (ATS), however, it should be appreciated that these embodiments may also or alternatively be utilized as maintenance transfer switches (MTS).

An embodiment of an ATS includes two input power sources, referred to herein as "$A_{in}$" and "$B_{in}$," and one or more power outputs connected to exactly one of the input power sources at any given time. In some ATS systems the one or more power outputs can be manually switched to be electrically connected to power source $A_{in}$ or $B_{in}$ and/or the one or more power outputs can be automatically switched to be electrically connected to power source $A_{in}$ or $B_{in}$ based on the health of the power sources.

Various aspects and embodiments of an ATS system disclosed herein include two power outputs, referred to herein as "$A_{out}$" and "$B_{out}$." During normal operation, when power sources $A_{in}$ and $B_{in}$ are operating properly, $A_{out}$ is electrically connected to $A_{in}$ and $B_{out}$ is electrically connected to $B_{in}$. If $A_{in}$ fails or is taken offline for maintenance or another reason, $A_{out}$ is switched to be electrically connected to $B_{in}$ so that both $A_{out}$ and $B_{out}$ are supported by $B_{in}$. If, instead, $B_{in}$ fails or is taken offline for maintenance or another reason, $B_{out}$ is switched to be electrically connected to $A_{in}$ so that both $A_{out}$ and $B_{out}$ are supported by $A_{in}$.

In some types of electrical systems, for example, some types of computer servers, the electrical system may be provided with dual power inputs and/or internal power supplies ("A Feed" and "B Feed") which provide redundant power to the electrical system to reduce the chance of a single power supply failure causing power supplied to the electrical system to be lost. It is desirable to provide continuous power to both of the dual power inputs of the electrical system to reduce the chance of interruption of power to the electrical system. For example, in the case where the dual power input electrical system is operating on power supplied through A Feed, B Feed may be non-operational or defective unbeknownst to an operator of the electrical system. If power to A Feed is suspended, for example, due to failure or for maintenance on a power supply connected to A Feed, B Feed should then support the power requirements of the electrical system. However, because, in this example, B Feed is unable to supply the requisite power, power to the electrical system may be interrupted and the electrical system may cease to function. The provision of power to both A Feed and B Feed of the electrical system from the power outlets, $A_{out}$ and $B_{out}$, respectively, of an ATS with dual power inputs and dual power outlets may reduce or eliminate the potential for this type of system failure.

ATSs with two power inlets and single power outlets are not typically used to support dual power inlet electrical systems. It may be possible to utilize a pair of single power outlet ATSs with the output of each ATS supporting one power inlet of the electrical system, and having each of the ATSs favoring a different power supply, for example, the first ATS set to operate in a default mode drawing power from a power supply A and the second ATS set to operate in a default mode drawing power from a power supply B. Such a two-ATS system, however, would utilize more space and would be more expensive than using a single dual input, dual output ATS (a "DI/DO ATS") to support the dual power inlet electrical system.

Aspects and embodiments of ATS systems including dual power inputs and dual power outlets will now be described with reference to the following non-limiting examples.

FIG. 1 schematically illustrates a first embodiment of a DI/DO ATS, indicated generally at 100. The DI/DO ATS 100 includes a pair of power input connectors 105A and 105B. The power input connectors 105A and 105B may be configured to receive three-phase power. The power input connectors 105A and 105B may be, for example, IEC309-20 type electrical connectors. In some embodiments, the power input connectors 105A and 105B may be supplied with power from an external power distribution unit, for example, 415 volt, three-phase, five wire power. The power input connectors 105A and 105B may be electrically coupled to fuse blocks 110, which may include, for example, 30 Amp Telemecanique LS1D32 fuse holders. Safety relays 115 may be electrically connected between the fuse blocks 110 and additional internal components of the DI/DO ATS 100. The safety relays 115 may be utilized to disconnect power from internal components of the DI/DO ATS 100 to reduce the chance of electrical shock to an operator while, for example, performing maintenance on the DI/DO ATS 100.

Selector relays 120 may be used to electrically connect power output connectors 125A and 125B to electrical outputs of the safety relays 115 through conductors extending from the safety relays 115 to the selector relays 120. The power output connectors 125A and 125B may be, for example, IEC309-20 type electrical connectors. As illustrated in FIG. 1, a single selector relay 120 may be utilized to selectively electrically connect both of the power input connectors 105A and 105B to one of the power output connectors 125A and 125B. A single selector relay 120 may include eight input terminals, four output terminals, and four switching elements to selectively provide three-phase power from both of the power input connectors 105A and 105B to one of the power output connectors 125A and 125B.

In use, when power is supplied to both of the power input connectors 105A and 105B, the selector relays 120 may be set to a default setting such that a first of the power output connectors 125A and 125B is electrically connected to a first of the power input connectors 105A and 105B while the second of the power output connectors 125A and 125B is electrically connected to the second of the power input connectors 105A and 105B. In the event of failure of power supplied to one of the power input connectors 105A and 105B, the selector relays 120 switch to electrically connect both of the power output connectors 125A and 125B to the power input connector 105A or 105B which is still receiving input power. If the ATS were operating in a mode where each of the power output connectors 125A and 125B were electrically connected to different ones of the power input connectors 105A and 105B, only one of the selector relays 120 would switch to electrically connect both of the power output connectors 125A and 125B to the power input connector 105A or 105B which is still receiving input power The selector relays 120 and the safety relays 115 may be controlled by a microcontroller 130. The microcontroller 130 may include a microprocessor and associated memory, an application specific integrated circuit (ASIC), or other form of controller known in the art. Aspects and embodiments disclosed herein are not limited to any particular type of microcontroller 130.

The microcontroller 130 may sense the state of power supplied to the power input connectors 105A and 105B through a sensing system 135, for example, one or more voltage meters, which may be in electrical communication with one or more of the conductors providing electrical connection between the safety relays 115 and the selector relays 120 or with outputs from the power input connectors 105A and 105B either before or after the fuse blocks 110. Upon receiving a signal from the sensing system 135 that power from one of the power input connectors 105A and 105B has been interrupted, the microcontroller may send a signal to the selector relays 120 to switch to electrically connect the power output connectors 125A and 125B to one of the power input connectors 105A and 105B which is still receiving power.

The microcontroller 130 may be in electrical communication with a local user interface 140, for example, a touch screen, a LED or LCD display, and/or one or more input devices, for example, a keyboard, a keypad, or a pointing device, which may be accessed by a user to obtain information regarding the status of the DI/DO ATS 100, to control the safety relays 115 and/or the selector relays 120, to program the microcontroller 130, or to perform other functions as would be recognized by one of ordinary skill in the art. The microcontroller 130 may also be in electrical communication with a network interface card 145 which may be used to communicate information regarding the status of the DI/DO ATS 100 to an external system 170 and/or to receive commands from the external system 170 over a network, for example, a local area network (LAN) or the internet using, for example RS-232, http, or any other communication protocol known in the art. The external system 170 may be, for example, a building management system or a centralized control computer which may be utilized to monitor and/or control one or multiple ATS systems.

The microcontroller 130 and other components of the DI/DO ATS 100, for example, the local user interface 140 and network interface card 145, may be supplied with power through power supply units 150. The power supply units 150 may be in electrical communication with outputs of the safety relays 115 or to outputs from the power input connectors 105A and 105B either before or after the fuse blocks 110 and may convert power supplied from the power input connectors 105A and 105B to a form useable by the microcontroller 130 and other components of the DI/DO ATS 100, for example, to 24 volt direct current power. A first of the power supply units 150 may be in electrical communication with power outputs from a first of the safety relays 115 or power input connectors 105A and 105B while the second of the power supply units may be in electrical communication with power outputs from the second of the safety relays 115 or power input connectors 105A and 105B so that power to the microcontroller 130 and other components of the DI/DO ATS 100 from the power supply units 150 is not lost upon failure of a power supply electrically connected to one of the power input connectors 105A and 105B.

The components of the DI/DO ATS 100 may be contained in a case 155, with the power input connectors 105A and 105B and the power output connectors 125A and 125B mounted on external surfaces of the case. The case may be sized and shaped to fit into a standard electrical equipment rack, for example, a standard 19-inch or 23-inch equipment rack conforming to the EIA-310-D specification for electrical equipment racks which are commonly used to house servers and other electrical equipment in a data center. A fan 160 may be supplied inside the case to remove hot air generated by the components of the DI/DO ATS 100 from inside the case 155 through an air vent in a wall of the case 155. The fan 160 may be supplied with power from the power supply units 150.

Although the components of the DI/DO ATS 100, for example, the microcontroller 130, network interface card 145, sensing system 135, and power supply units 150 are illustrated in FIG. 1 as being located internal to the case 155, it should be appreciated that in various embodiments, any one or more of these components may be located external to the case 155 and be in electrical communication with other components of the DI/DO ATS 100. Further, the microcontroller 130, network interface card 135, and local user interface 140 may be in either wired or wireless communication with one another or with one or more systems external to the DI/DO ATS 100.

Figure 2:
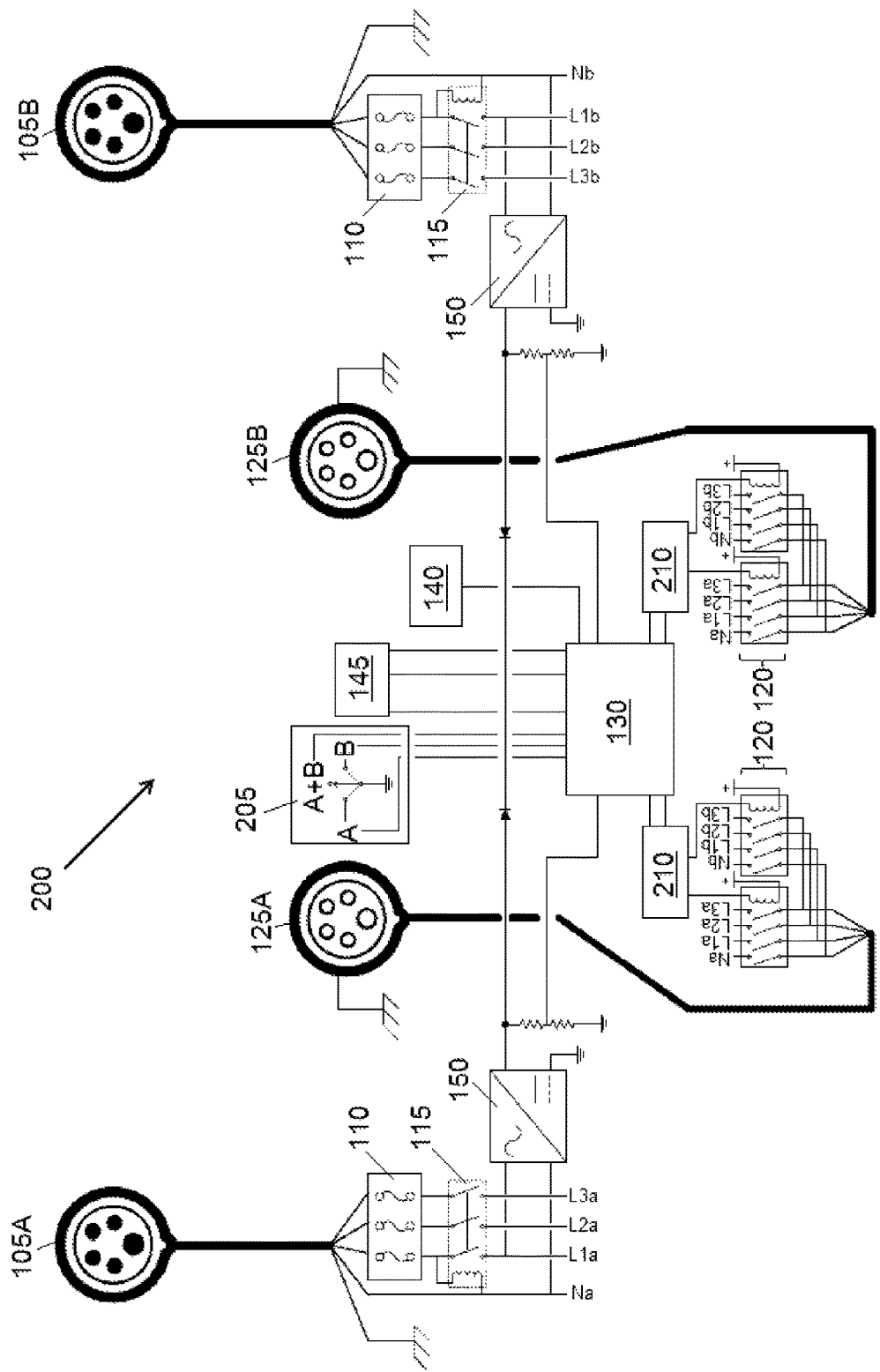
FIG. 2 is a schematic diagram of another embodiment of an automatic transfer switch including a mode selection switch.

In another embodiment, illustrated generally at 200 in FIG. 2, a DI/DO ATS 200 may include a manually-operated mode selector switch 205. The mode selector switch 205 may enable an operator to manually select from which of the power input connectors 105A and 105B the DI/DO ATS 200 should draw power. The mode selector switch 205 may provide a signal to the microcontroller 130 to open or close the safety relays 110 and/or selector relays 120 to electrically connect or disconnect the power input connectors 105A or 105B from the remainder of the components of the DI/DO ATS 200. In an "A+B" selection position of the mode selector switch 205, both of the power input connectors 105A and 105B of the DI/DO ATS 200 may be utilized and the DI/DO ATS 200 may operate in a similar manner as the DI/DO ATS 100 described above. In an "A" position selection position of the mode selector switch 205, only power input connector 105A would be utilized by the DI/DO ATS 200. In a "B" position selection position of the mode selector switch 205, only power input connector 105B would be utilized by the DI/DO ATS 200. Providing for power from the power input connectors 105A and 105B of the DI/DO ATS 200 to be selectively connected or disconnected provides for an operator to perform maintenance on a disconnected power supply to one of the power input connectors 105A and 105B and/or on circuitry internal to the DI/DO ATS 200 associated with the disconnected power inlet connector while allowing for the DI/DO ATS 200 to continue to provide power to an electrical system from the connected power inlet. It should be appreciated in that in some embodiments, the mode selector switch 205 may be a manually-operated switch that a user may physically turn or otherwise actuate to select a particular mode of operation of the DI/DO ATS 200. In other embodiments, the mode selector switch 205 may be actuated to select a particular mode of operation of the DI/DO ATS 200 by a command entered locally through the user interface 140 or remotely from an external system.

As also illustrated in FIG. 2, the DI/DO ATS 200 includes interlock/driver circuits 210 which operate the signal relays 120 responsive to signals received from the microcontroller 130. Further, as also illustrated in FIG. 2, the selector relays 120 are broken into two separate relays for each power output connector 125A and 125B, each separate relay associated with only one of the power input connectors 105A and 105B. The selector relays 120 may include four input terminals, four output terminals, and four switching elements to selectively provide three-phase power from one of the power input connectors 105A and 105B to one of the power output connectors 125A and 125B. It should be understood that the electrical conductors extending from the safety relays 115 and power inlet connectors and labeled Na, L1a, L2a, L3a, Nb, L1b, L2b, and L3b are electrically connected to the correspondingly labeled electrical connections on the selector relays 120. It should be understood that the two separate relays for each power output connector 125A and 125B may be collectively referred to as a single electrical switch.

Figure 3:
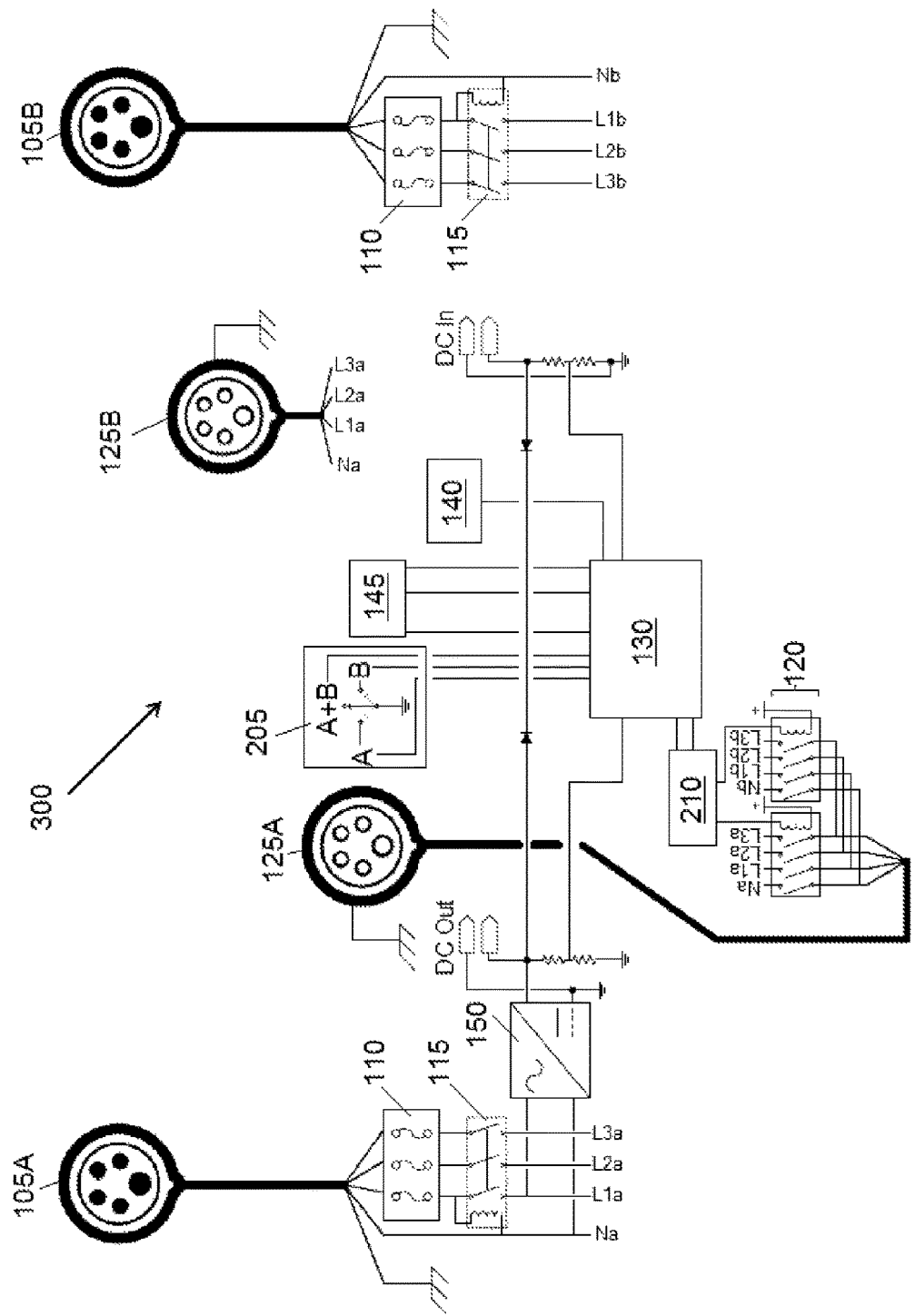
FIG. 3 is a schematic diagram of another embodiment of a modular automatic transfer switch including two sub-modules.

In another embodiment, illustrated in FIG. 3, a modular DI/DO ATS may include two identical sub-units 300, each enclosed in a separate casing. FIG. 3 illustrates one of the sub-units 300. In the illustrated sub-unit 300, power from power input connector 105A is supplied directly to power outlet connector 125B. The power outlet connector 125A of a first sub-unit 300 is electrically connected to the power inlet connector 105B of a second sub-unit 300 (not shown). The power outlet connector 125A of the second sub-unit 300 is electrically connected to the power inlet connector 105B of the first sub-unit 300. The power inlet connectors 105A of the two sub-units are supplied with power from different power sources. To provide redundant DC power for the internal components of the modular DI/DO ATS, DC power from each sub-unit is provided to the other by electrically connecting the "DC Out" electrical contacts in each sub-unit with the "DC In" electrical contacts in the other sub-unit. The provision of a DI/DO ATS as two sub-units instead of as a single unit provides modularity to the system and allows for a disabled or malfunctioning sub-unit to be removed and replaced or serviced while the other sub-unit continues to provide power to an electrical system supported by the modular DI/DO ATS. It should be understood that in FIG. 3, the electrical conductors extending from the safety relays 115 and power inlet connectors and labeled Na, L1a, L2a, L3a, Nb, L1b, L2b, and L3b are electrically connected to the correspondingly labeled electrical connections on the selector relays 120.

Figure 4:
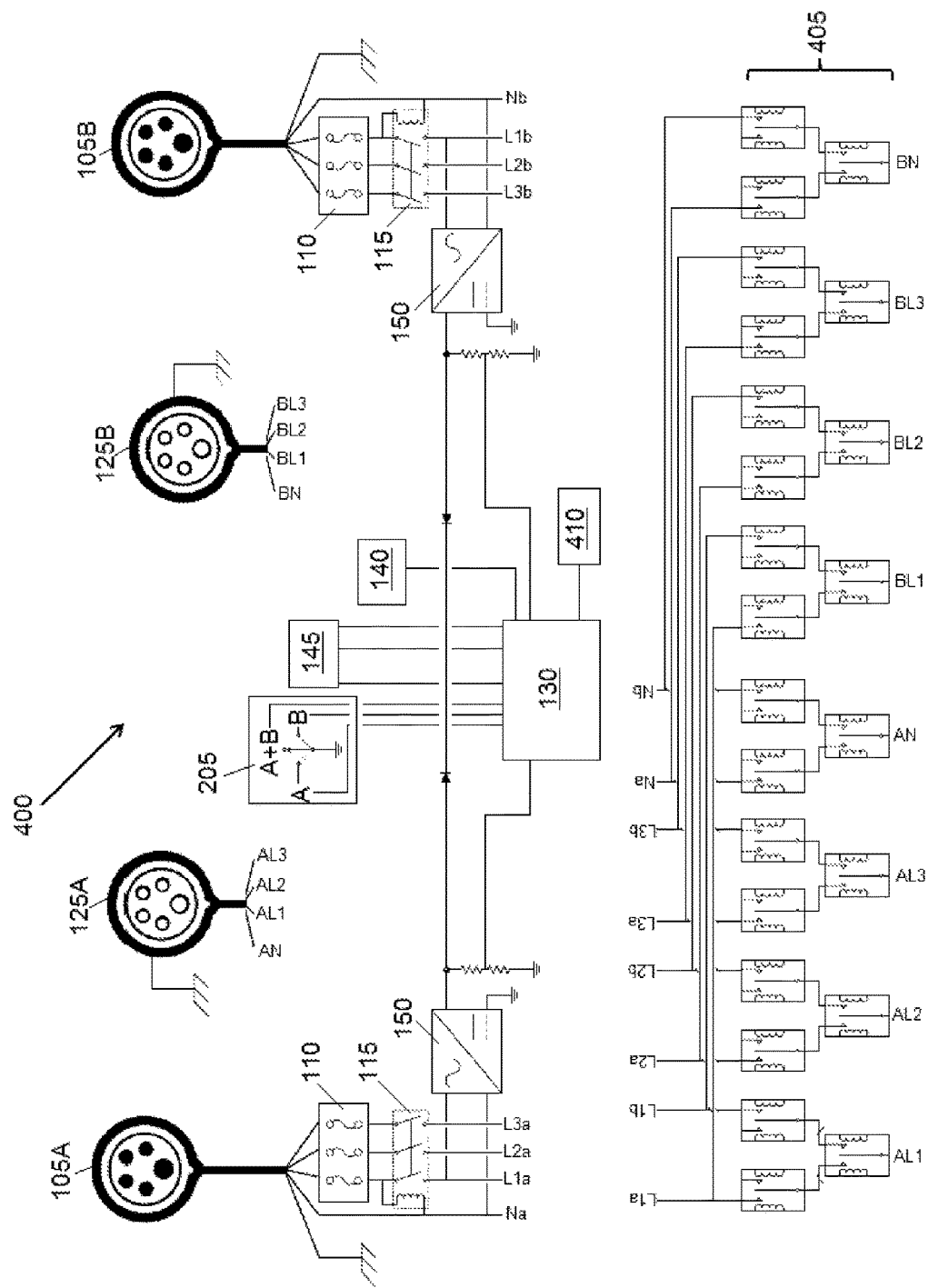
FIG. 4 is a schematic diagram of another embodiment of an automatic transfer switch including dual-coiled series-wired switching relays.

In another embodiment, illustrated generally at 400 in FIG. 4, selector relays 120 as illustrated in the DI/DO ATS systems of FIG. 1, FIG. 2, and FIG. 3 may be replaced by a bank of dual coiled relays 405. Dual coiled relays may provide advantages over single coiled or coil/spring relays, for example, by switching from one set of input contacts to a second set of input contacts at a substantially similar speed as switching from the second set of input contacts to the first set of input contacts, thus making the switching speeds consistent. Single coiled or coil/spring relays may exhibit asymmetric switching speeds.

The dual coiled relays 405 include inputs labeled in FIG. 4 as Na, L1a, L2a, L3a, Nb, L1b, L2b, and L3b which are electrically connected to the correspondingly labeled electrical conductors extending from the safety relays 115 and power inlet connectors 105A and 105B. The dual coiled relays 405 include outputs labeled in FIG. 4 as AN, AL1, AL2, AL3, BN, BL1, BL2, and BL3 which are electrically connected to the correspondingly labeled electrical conductors extending from the power output connectors 125A and 125B. The dual coiled relays 405 are controlled by the microcontroller 130, which may provide signals to driver circuitry 410 which is in electrical communication with the coils of the dual coiled relays 405 through to electrical conductors (omitted from FIG. 4 for clarity). The driver circuitry 410 may provide current to the coils of appropriate sets of dual coiled relays 405 responsive to a signal from the microprocessor to put the power output connectors 125A and 125B in electrical communication with the power inlet connector 105A and/or 105B when power is available from the power inlet connectors 105A and/or 105B. For example, when power is available from both power inlet connectors 105A, 105B the dual coiled relays 405 with the AN, AL1, AL2, and AL3 outputs will have the coils associated with inputs Na, L1a, L2a, L3a energized, and the dual coiled relays 405 with the BN, BL1, BL2, and BL3 outputs will have the coils associated with inputs Nb, L1b, L2b, and L3b energized. If power is only available from power inlet connector 105A, the coils of each of the dual coiled relays 405 associated with inputs Na, L1a, L2a, L3a will be energized. If power is only available from power inlet connector 105A, the coils of each of the dual coiled relays 405 associated with inputs Nb, L1b, L2b, and L3b will be energized. It should be understood that bank of dual coiled relays may be collectively referred to as a single electrical switch or as a first electrical switch in electrical communication with the first power outlet connector 125A and a second electrical switch in electrical communication with the second power output connector 125B.

A further advantage of utilizing dual coiled relays 405 in series for switching a source of power from one power inlet connector 105A, 105B to another power inlet connector 105A, 105B as illustrated in FIG. 4 is that voltage drop across the switch formed from the dual coiled relays 405 is split between two dual coiled relays 405. This provides for increased reliability of the dual coiled relays 405 by reducing the voltage drop across each of the dual coiled relays 405 and/or allows for the use of dual coiled relays 405 which may have a lower power rating, and thus which may be less expensive as compared to relays which might be required if the entire voltage drop occurred across a single relay.

Figure 5:
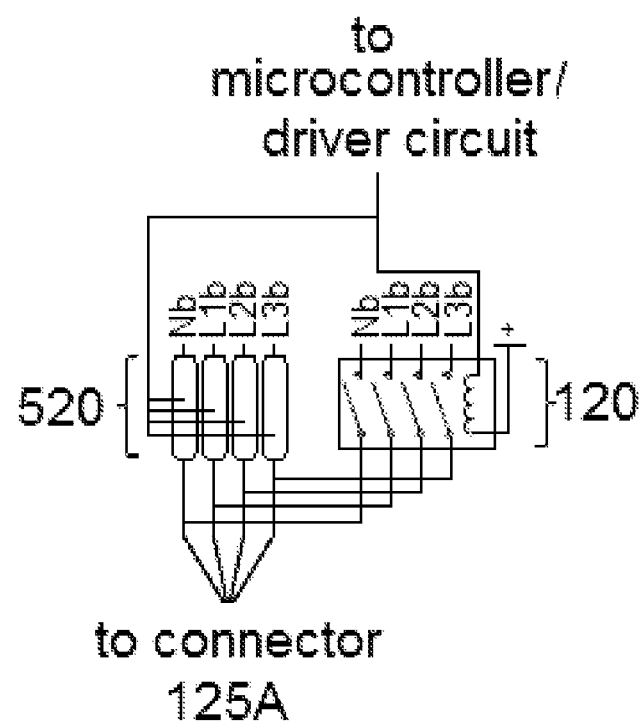
FIG. 5 is a schematic diagram of a power output switch of an embodiment of an automatic transfer switch including solid state switches and switching relays in parallel.

In any of the embodiments discussed above, solid state electrical switches, for example, silicon control rectifiers, may be utilized in place of or in parallel with the selector relays 120 and/or dual coiled relays 405 to selectively provide electrical connection between the power inlet connectors 105A, 105B and power outlet connectors 125A, 125B. An example of this configuration is illustrated in FIG. 5, where the selector relay 120 of FIG. 2 which is configured to selectively transmit power from power input connector 105B to power outlet connector 125A is illustrated with a bank of silicon control rectifiers 520 connected in parallel with the inputs and outputs of the selector relay 120. The silicon control rectifiers 520 may have faster switching speeds than the selector relay 120, for example, within half of a line cycle for the silicon control rectifiers 520 to switch on or off as compared to from about 3 milliseconds to about 10 milliseconds for the selector relays 120 or dual coiled relays 405 to switch on or off. Some electrical systems may not be disrupted by the interruption of power for the time it would take the selector relays 120 or dual coiled relays 405 to switch. Other types of more sensitive electrical systems, however, may have their operation disrupted if power was lost for the time it would take the selector relays 120 or dual coiled relays 405 to switch. For these more sensitive electrical systems, the provision of the silicon control rectifiers 520 in place of or in parallel with the selector relays 120 or dual coiled relays 405 would provide a safeguard against power being disrupted for too long a time period when the ATS including the silicon control rectifiers 520 switched from one power supply inlet to another to supply power to a power supply outlet supplying power to the electrical system. It should be understood that bank of silicon control rectifiers 520 in combination with the one or more of the selector relays 120 and/or the dual coiled relays may be collectively referred to as a single electrical switch or as a first electrical switch in electrical communication with the first power outlet connector 125A and a second electrical switch in electrical communication with the second power output connector 125B.

Upon receiving a command to electrically connect a power inlet connector to a power outlet connector, the silicon control rectifiers 520 may be used to provide power from the power inlet connector to the power outlet connector during the time it takes for the associated selector relay(s) or dual coiled relays to switch on. The silicon control rectifiers 520 may be switched off after a set time period or after the microcontroller receives a signal indicative of the associated selector relay(s) or dual coiled relays switching on and providing electrical connection between the power inlet connector and the power outlet connector.

It will be appreciated that various modifications to the embodiments described above may be made. For example, embodiments of an ATS in accordance with the present disclosure may include more than two, for example, three, four, or more power inlet connectors and/or more than two, for example, three, four, or more power outlet connectors. The ATS may selectively electrically connect any one or more of the plurality of power inlet connectors to any one or more of the power outlet connectors responsive to a monitored condition of one or more power supplies electrically feeding the one or more of the plurality of power inlet connectors. The power supplies may include any one or more of uninterruptible power supplies, utility power supplies, and local electrical generators. In various embodiments any form of electrical switch may be used in addition to or as an alternative to the selector relays 120 and/or dual coiled relays 405 and/or silicon control rectifiers 520 to selectively electrically connect power inlet connectors of the ATS to power outlet connectors of the ATS. The electrical switches may be, for example, one or more power transistors or one or more manually operated switches. The safety relays 115 may also be augmented by or replaced with any manually operated or electrically operated switch known in the art. In other embodiments, the ATS may include or have power outlet connectors electrically coupled to an uninterruptible power supply between the power outlet connectors and an electrical system supported by the ATS. The uninterruptible power supply may be used to supply continuous power to a load, for example, an electrical system coupled to one or more power outlet connectors of the ATS while the selector relays 120 and/or dual coiled relays 405 and/or silicon control rectifiers 520 and/or other form of switch change an electrical connection from one power inlet connector of the ATS to another.

Figure 6:
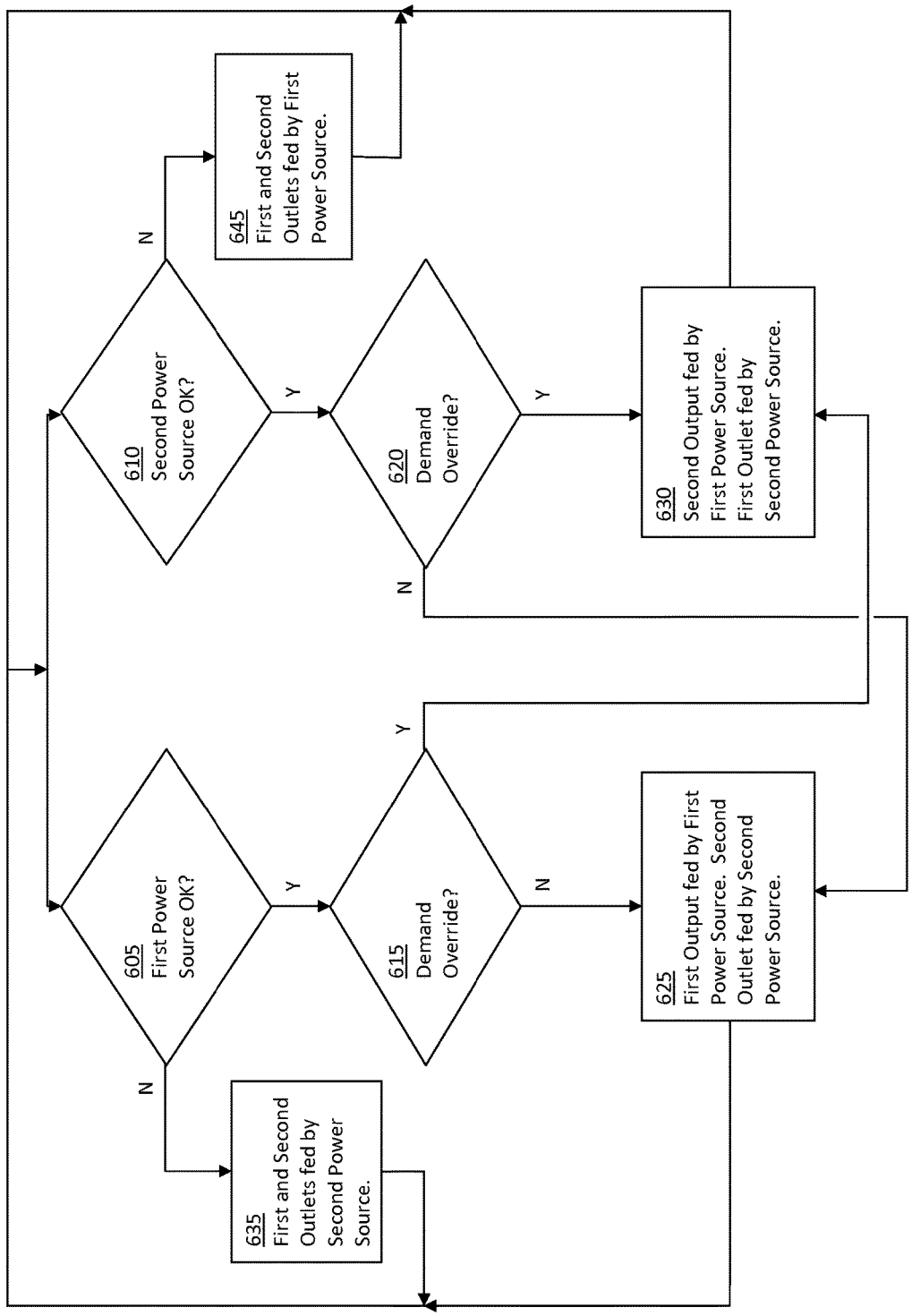
FIG. 6 is a flowchart of a method of operating an embodiment of an automatic transfer switch.

A method of operating the various embodiments of the DI/DO ATS systems described above is illustrated in the flowchart of FIG. 6. In the initial acts of the method, acts 605 and 610, the ATS system checks on the status of power supplied to the power inlets, for example, power inlet connectors 105A and 105B. This check may be performed by monitoring the voltage and/or current on or through conductors in electrical communication with the power inlet connectors with a sensing system, for example, a sensor system including a voltage and/or current meter which provides a signal to a controller of the ATS. If a first power supply connected to the first power inlet is non-functional or not providing adequate power, the ATS electrically connects both power outlets of the ATS, for example, power outlet connectors 125A and 125B, to a second power supply through the second power inlet (act 635). If the second power supply connected to the second power inlet is non-functional or not providing adequate power, the ATS electrically connects both power outlets of the ATS to the first power supply through the first power inlet (act 645). The ATS then continues to monitor the state of the power supplies until both of the power supplies become functional again.

If the first power source is determined by the ATS to be functioning properly, the ATS checks if any override of the first power supply has been demanded, for example, by a command input through the user interface 140, or a selection made with the mode selector switch 205 (act 615). If no override is detected, the ATS electrically connects the first power outlet to the first power inlet and the second power outlet to the second power inlet. In the case that the second power supply is not functioning properly, however, the ATS will connect both power outlets to the first power inlet (act 645). If an override is detected, and the second power supply is operational, the ATS will electrically connect the second power outlet to the first power inlet and the first power outlet to the second power inlet (act 630). Alternatively, for example, if the override specifies to only use the first power supply, the ATS will electrically connect both power outlets to the first power inlet. The method will then return to acts 605 and 610 where the status of the power supplies is monitored.

If the second power source is determined by the ATS to be functioning properly, the ATS checks if any override of the second power supply has been demanded, for example, by a command input through the user interface 140, or a selection made with the mode selector switch 205 (act 620). If no override is detected, the ATS electrically connects the first power outlet to the first power inlet and the second power outlet to the second power inlet (act 625). In the case that the first power supply is not functioning properly, however, the ATS will connect both power outlets to the second power inlet (act 635). If an override is detected, and the first power supply is operational, the ATS will electrically connect the second power outlet to the first power inlet and the first power outlet to the second power inlet (act 630). Alternatively, for example, if the override specifies to only use the second power supply, the ATS will electrically connect both power outlets to the second power inlet. The method will then return to acts 605 and 610 where the status of the power supplies is monitored.

Having thus described several aspects of at least one embodiment of this invention, it is to be appreciated various alterations, modifications, and improvements will readily occur to those skilled in the art. For example, it is to be appreciated that any of the features of any of the embodiments disclosed herein may be combined or substituted for features of any other embodiment disclosed herein. Acts of the method disclosed may be performed in alternate orders and one or more acts may be added to or omitted from the method or substituted by one or more alternative acts. Such alterations, modifications, and improvements are intended to be part of this disclosure, and are intended to be within the scope of the disclosure. Accordingly, the foregoing description and drawings are by way of example only.

What is claimed is:

1. An automatic transfer switch comprising:
 a plurality of power input connectors;
 a plurality of power output connectors; and
 at least one electrical switch configured to selectively electrically connect at least one of the plurality of power input connectors to at least one of the plurality of power output connectors, the at least one electrical switch including:
  a plurality of electrical inputs in electrical communication with a first of the plurality of power input connectors;
  a plurality of electrical inputs in electrical communication with a second of the plurality of power input connectors; and
  a plurality of electrical outputs in electrical communication with a first of the plurality of power output connectors.

2. The automatic transfer switch of claim 1, wherein the at least one electrical switch is configured to selectively electrically connect the first of the plurality of power output connectors to one of the first of the plurality of power input connectors and the second of the plurality of power input connectors and to selectively electrically connect a second of the plurality of power output connectors to one of the first of the plurality of power input connectors and the second of the plurality of power input connectors.

3. The automatic transfer switch of claim 2, wherein the at least one electrical switch is configured to selectively electrically connect the first of the plurality of power output connectors and the second of the plurality of power output connectors to the second of the plurality of power input connectors responsive to failure of a power supply electrically connected to the first of the plurality of power input connectors.

4. The automatic transfer switch of claim 3, wherein the at least one electrical switch includes:
 a first relay in electrical communication with the first of the plurality of power output connectors; and
 a second relay in electrical communication with the second of the plurality of power output connectors.

5. The automatic transfer switch of claim 4, wherein the at least one electrical switch includes a plurality of relays electrically connected in series.

6. The automatic transfer switch of claim 4, wherein the at least one electrical switch includes at least one solid state switch electrically connected in parallel with at least one of the first relay and the second relay.

7. The automatic transfer switch of claim 3, further comprising a selector switch, the selector switch configured to set the automatic transfer switch in one of a mode in which power delivered to the plurality of power output connectors is drawn from the first of the plurality of power inlet connectors and the second of the plurality of power inlet connectors, a mode in which power delivered to the plurality of power output connectors is drawn from the first of the plurality of power inlet connectors only, and a mode in which power delivered to the plurality of power output connectors is drawn from the second of the plurality of power inlet connectors only.

8. The automatic transfer switch of claim 7, wherein the selector switch is a manually operated switch.

9. The automatic transfer switch of claim 7, wherein the selector switch is an electrically operated switch.

10. The automatic transfer switch of claim 3, having a default mode wherein power is delivered to the first of the plurality of power output connectors from the first of the plurality of power input connectors and power is delivered to the second of the plurality of power output connectors from the second of the plurality of power input connectors.

11. The automatic transfer switch of claim 3, including a first sub-unit and a second sub-unit, each of the first sub-unit and the second sub-unit including a plurality of power input connectors and a plurality of power output connectors.

12. The automatic transfer switch of claim 11, wherein a first of the plurality of power output connectors of the first sub-unit is electrically coupled to a first of the plurality of power input connectors of the second sub-unit, and a first of the plurality of power output connectors of the second sub-unit is electrically coupled to a first of the plurality of power input connectors of the first sub-unit.

13. The automatic transfer switch of claim 11, wherein a direct current power source in the first sub-module is electrically coupled to a direct current power inlet of the second sub-module, and a direct current power source in the second sub-module is electrically coupled to a direct current power inlet of the first sub-module.

14. A method of providing power to an electrical system, the method comprising:
  electrically connecting a first power source to a first power inlet of an automatic transfer switch;
  electrically connecting a second power source to a second power inlet of the automatic transfer switch;
  electrically connecting the first power inlet of the automatic transfer switch to a first power outlet of the automatic transfer switch with a first electrical switch including:
    a plurality of electrical inputs in electrical communication with the first power inlet;
    a plurality of electrical inputs in electrical communication with the second power inlet; and
    a plurality of electrical outputs in electrical communication with the first power outlet;
  electrically connecting the second power inlet of the automatic transfer switch to a second power outlet of the automatic transfer switch with a second electrical switch including:
    a plurality of electrical inputs in electrical communication with the first power inlet;
    a plurality of electrical inputs in electrical communication with the second power inlet; and
    a plurality of electrical outputs in electrical communication with the second power outlet;
  electrically connecting the first power outlet of the automatic transfer switch to a first power inlet of the electrical system; and
  electrically connecting the second power outlet of the automatic transfer switch to a second power inlet of the electrical system.

15. The method of claim 14, further comprising, responsive to a failure of the first power supply, electrically disconnecting the first power inlet of the automatic transfer switch from the first power outlet of the automatic transfer switch and electrically connecting the second power inlet of the automatic transfer switch to the first power outlet of the automatic transfer switch.

16. The method of claim 15, wherein electrically connecting the second power inlet of the automatic transfer switch to the first power outlet of the automatic transfer switch includes:
  electrically connecting the second power inlet of the automatic transfer switch to the first power outlet of the automatic transfer switch through a solid state electrical switch;
  electrically connecting the second power inlet of the automatic transfer switch to the first power outlet of the automatic transfer switch through a relay; and
  opening the solid state electrical switch and terminating electrical connection between the second power inlet of the automatic transfer switch and the first power outlet of the automatic transfer switch through the solid state electrical switch after electrically connecting the second power inlet of the automatic transfer switch to the first power outlet of the automatic transfer switch through the relay.

17. The method of claim 14, further comprising, responsive to a selection of an operating mode of the automatic transfer switch with a selector switch of the automatic transfer switch, electrically disconnecting the first power inlet of the automatic transfer switch from the first power outlet of the automatic transfer switch and electrically connecting the second power inlet of the automatic transfer switch to the first power outlet of the automatic transfer switch.

18. The method of claim 14, wherein electrically connecting the second power inlet of the automatic transfer switch to the first power outlet of the automatic transfer switch includes electrically connecting the second power inlet of the automatic transfer switch to the first power outlet of the automatic transfer switch though a plurality of relays electrically connected in series.

19. The method of claim 14, further comprising:
  electrically connecting the first power source to a first power inlet of a first sub-unit of the automatic transfer switch;
  electrically connecting the first power source to a first power inlet of a second sub-unit of the automatic transfer switch;
  electrically connecting a first power outlet of the first sub-unit of the automatic transfer switch to a second power inlet of the second sub-unit of the automatic transfer switch; and electrically connecting a first power outlet of the second sub-unit of the automatic transfer switch to a second power inlet of the first sub-unit of the automatic transfer switch.

20. The method of claim 19, wherein electrically connecting the first power outlet of the automatic transfer switch to the first power inlet of the electrical system includes electrically connecting a second power outlet of the first sub-unit of the automatic transfer switch to the first power inlet of the electrical system, and electrically connecting the second power outlet of the automatic transfer switch to the second power inlet of the electrical system includes electrically connecting a second power outlet of the second sub-unit of the automatic transfer switch to the second power inlet of the electrical system.

* * * * *